United States Patent
Sharpe

(10) Patent No.: US 6,700,591 B1
(45) Date of Patent: Mar. 2, 2004

(54) VARIABLE VISUAL INDICATORS BASED ON PREDETERMINED CHARACTERISTICS

(75) Inventor: Timothy David Sharpe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/565,014

(22) Filed: May 4, 2000

(51) Int. Cl.⁷ .................................................. G06F 3/00
(52) U.S. Cl. ........................................ 345/762; 345/853
(58) Field of Search ................................ 345/762, 853, 345/854, 765, 763, 764, 966, 967, 761, 806

(56) References Cited

U.S. PATENT DOCUMENTS 5,805,164 A   9/1998   Blum et al.
6,188,405 B1 * 2/2001   Czerwinski .................. 345/764
6,243,092 B1 * 6/2001   Okita et al. .................. 345/839
6,486,893 B1 * 11/2002  Ramchandani et al. ..... 345/762

* cited by examiner

*Primary Examiner*—Cao (Kevin) Nguyen
(74) *Attorney, Agent, or Firm*—Merchant & Gould P.C.

(57) ABSTRACT

A system and method for displaying property information, such as time or size information, on a display without displaying the textual column for these properties. The method compares predetermined properties of an item to a threshold value and assigns varying display indicators to the items based on the item's properties. The varying display indicators, such as colored fonts, have a variable quality such that as the relative properties for the item change, the variable indicator may also change accordingly. Additionally, the system and method updates the threshold value and the assigned variable visual indicators so the display characteristics change as the value changes. Thus, information is displayed to the user based on relative properties of the item without displaying explicit text.

22 Claims, 5 Drawing Sheets

VARIABLE VISUAL INDICATORS BASED ON PREDETERMINED CHARACTERISTICS

TECHNICAL FIELD

The present invention relates to graphical user interfaces, and particularly to display or visual characteristics and methods for determining display characteristics for user interfaces. More particularly still, the present invention relates to variable display indicators to relay information to users of computing devices.

BACKGROUND OF THE INVENTION

Small, handheld computing devices have been steadily growing in popularity in recent years. The devices are known by different names, such as palmtops, pocket computers, personal digital assistants, personal organizers, H/PCs (handheld personal computers), or the like. These devices, hereinafter "small computer devices," provide much of the same functionality as their larger counterparts. In particular, the small computer devices provide users the ability to perform word processing, task management, spreadsheet processing, address book functions and Internet browsing, as well as many other functions. Of particular importance to small computer device users is the ability to receive, read and respond to email from various mobile or remote locations.

Given the small size of these devices, users gain mobility but typically lose other benefits of the larger computer systems. One such drawback relates to the fact that small computer devices typically have significantly smaller display areas. That is, these devices tend to have display areas that are less than one-eighth the size of average, desktop display areas. Consequently, due to the limitations of the display sizes, some beneficial information is simply not displayed to users during the use of certain applications.

As an example, when using a large display monitor to view a list of items, such as email messages, tasks or other electronic documents, a user sees quite a bit of information related to the item, other than just the name of the item. Essentially, each item has various unique characteristics or properties, such as the item's, name, subject, size, and "age." The age of an item relates to the time it was received, if it is an email message, or the time it was last modified, if it is a file, or a due date, if it is a task, or some other time information. These various properties, e.g., the size and age of the item, are typically displayed in combination with the name of the item. Typically, the display shows these separate properties in columns, providing the user a significant amount of information about each item, which allows the user to visually sort the list of items based on separate criteria. Therefore, if the user is only concerned with recent items of a particular type, the user can sort the items by type and then visually scan the age column to locate the desired items without examining each item in detail.

Comparatively however, small computer devices cannot display the same amount of information as the larger monitors. In order to compensate for the small display areas, the small computer devices, or more particularly, the applications running on the small computer devices simply eliminate columns of information from the display. For example, in an email application where each message has a "From" property, a "Subject" property and a "Received" property, the application may chose not to show the "Received" column to provide more space for the "Subject" column. Simply removing the column of information in this manner, however, is unsatisfactory since the time property for email is a property that users typically want to see as they scan the list of items.

In some email applications, or other applications providing a list view, the list may be sorted by time such that if the time property was not shown, the users could still visually determine the relative age of the items with respect to the other items. However, many users also sort their items based on various other properties, such as by the name of the person who sent the email. When sorted by a property other than time, the user needs the time information column to determine which items are more recent. For many users, it is important to be able to sort mail based on other properties and still be able to readily recognize the recently received items from the older, stale email messages.

An alternative solution to optimizing the display space relates to having the small computer device narrow the width of each column. Unfortunately however, narrowing each column significantly limits the amount of property information available to a user. That is, the reduced size of the column typically truncates the information, often to the point that no meaningful information can be gleaned from the remaining text and therefore narrowing columns is generally an unsatisfactory solution. For example, narrowing the "Subject" column from an email application to allow time information to be displayed may truncate the subject text such that the user cannot determine the message subject. Moreover, since many users place the entire message in the subject line, increasing the available subject space is preferred.

It is with respect to these considerations and others that the present invention has been made.

SUMMARY OF THE INVENTION

The present invention relates to a system and method for displaying property information, such as time information, on a display without displaying the textual column for these properties. The method of the present invention relates to comparing predetermined properties for an item to a threshold value and assigning varying display indicators to the items based on the item's relative properties. The varying display indicators, such as colored fonts, have a variable quality such that as a relative property for the item changes, the variable indicator changes accordingly. Thus, information is displayed to the user based on properties of the item without displaying explicit text.

In accordance with preferred aspects of the invention, an embodiment of the invention compares the determined property of an item and compares the property to a predetermined value and then varies the display accordingly. In one embodiment, the invention relates to an application that determines the relative "age" of an item based on the time the item was received or modified. The application then uses the relative age to vary the color or hue of the font used to display the other properties, such as the name or subject of the item. As the item ages, the color or hue changes to indicate the relative aging to the user. Thus, the application display need not show the time property column to provide time-property information to the user. In other embodiments, the variable indicators are different font sizes and font types, among other indicators.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

The present invention relates to a system and method of displaying property information for an item in a graphical user interface on a computer system wherein the method comprises the steps of comparing the property information to a value to generate a comparison value, assigning a visual indicator to the item related to the comparison value, wherein the-assigned visual indicator is one of at least three possible visual indicators; and displaying the item using the assigned visual indicator. Additionally, the system and method may also comprise the step of updating the value and the assigned variable visual indicators so the display characteristics change as the value changes.

In accordance with preferred aspects the present invention relates to assigning fonts having different colors, hues, type faces, sizes and/or other different visual characteristics to the text used to identify different items, e.g., the font used for the name of the item, based on different characteristics such as the time of the item. Moreover, as the characteristics change, such as when an item becomes older, the visual characteristics change accordingly. Changing the visual characteristics as the relative properties change provides the user with a significant amount information related to the item without displaying explicit text, such as the precise time for the item.

A more complete appreciation of the present invention and its improvements can be obtained by reference to the accompanying drawings, which are briefly summarized below, to the following detail description of presently preferred embodiments of the invention, and to the appended claims.

DETAILED DESCRIPTION OF THE INVENTION

An embodiment of the invention maximizes the use of a display area by providing beneficial information to a user through the use of visual indicators other than explicit text, such that the explicit text for that information need not be shown to the user. The information is displayed through the use of variations in the color of the font used to display other information, such as the name of the item, or through the use of another visible, yet variable indicator. The variations in color signify information relevant to the item as compared with other items in the list. Eliminating the display of explicit text for such information increases the available space on the display area allowing the display of additional information.

The logical operations of the various embodiments of the present invention are implemented (1) as a sequence of computer implemented steps or program modules running on a computing system and/or (2) as interconnected hardware or logic modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 1:
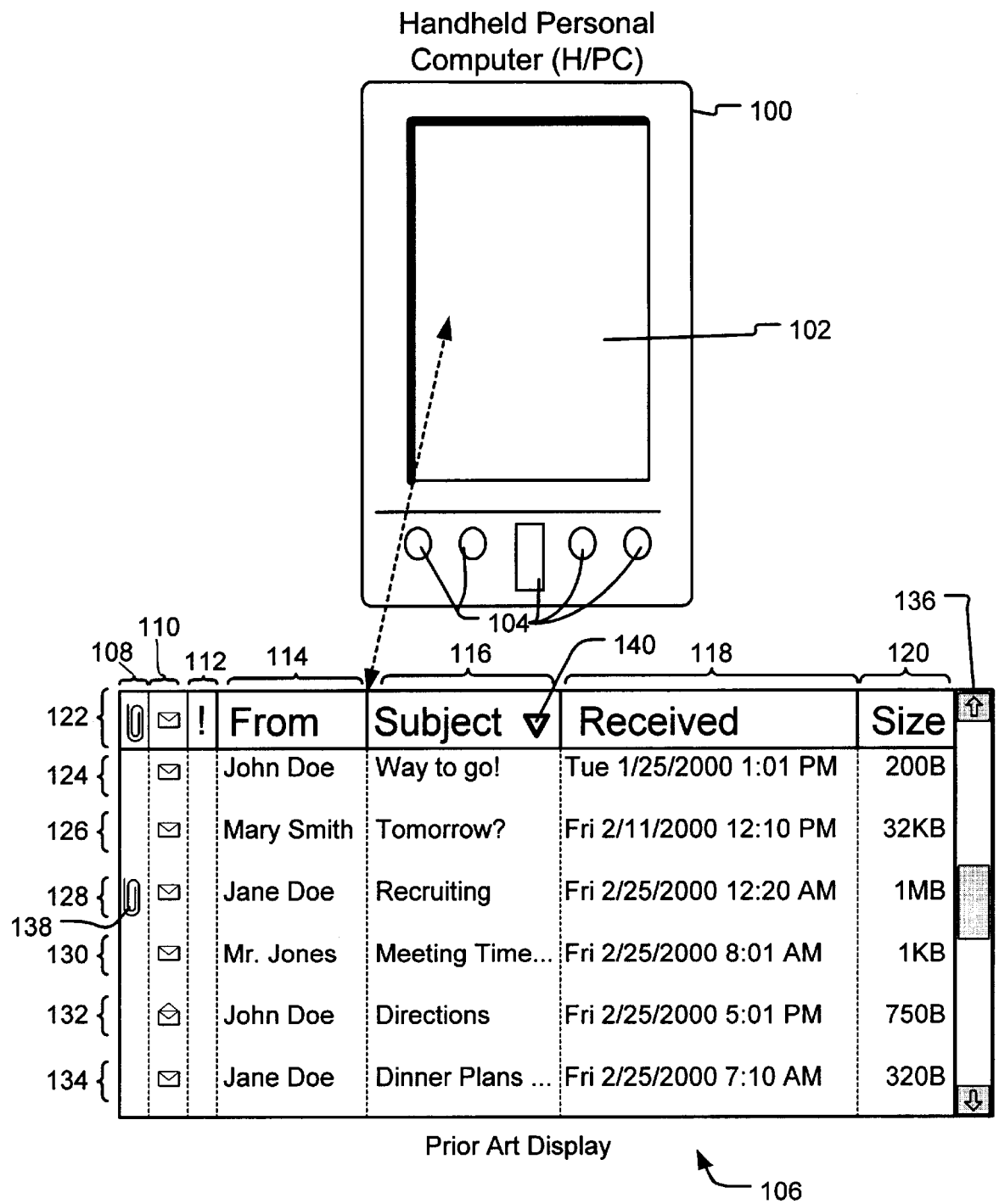
FIG. 1 illustrates a handheld computer displaying a prior art email application user interface.

A computing device 100 having a display 102 to display application user-interfaces in accordance with the present invention is shown in FIG. 1. Preferably, the display 102 is capable of displaying colors and hue variations. Alternatively, the display is able to present various levels of gray in order to provide distinguishable visual indicators.

In one embodiment of the invention, the computer 100 is as a small computer device (as described in the Background Section) having a small or significantly limited display area 102 and input buttons 104 to allow the user to enter information into the computer 100. Moreover, the display 102 may be a touch screen, further allowing user input, yet the touch screen is not necessary. In alternative embodiments, the invention is used in combination with any number of other computer systems or environments, such as in desktop environments, laptop or notebook computer systems, multiprocessor systems, micro-processor based or programmable consumer electronics, network PCs, mini computers, main frame computers and the like. The invention may also be practiced in distributed computing environments where tasks are performed by remote processing devices that are linked through a communications network in a distributed computing environment, programs may be located in both local and remote memory storage devices. In essence, any computer system having a graphical display capable of providing multiple distinguishing characteristics may incorporate the present invention.

Figure 2:
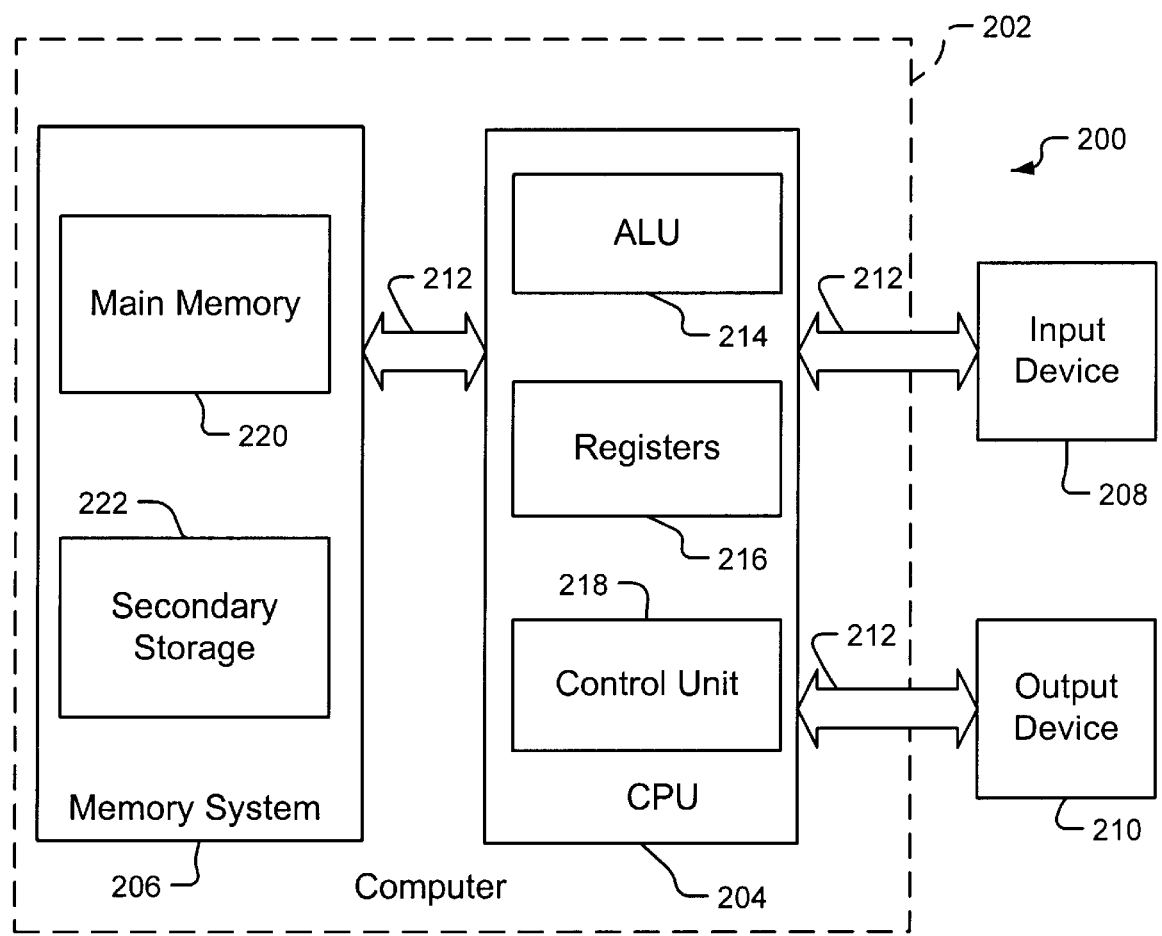
FIG. 2 is block diagram of a computer used in an embodiment of the present invention, such as the computer shown in FIG. 1.

The computer 100 (shown in FIG. 1) incorporates a system 200 of resources for implementing an embodiment of the invention, as shown in FIG. 2. The system 200 incorporates a computer 202 having at least one central processing unit (CPU) 204, a memory system 206, an input device 208, and an output device 210. These elements are coupled by at least one system bus 212.

The CPU 204 is of familiar design and includes an Arithmetic Logic Unit (ALU) 214 for performing computations, a collection of registers 216 for temporary storage of data and instructions, and a control unit 218 for controlling operation of the system 200. The CPU 204 may be a microprocessor having any of a variety of architectures including, but not limited to those architectures currently produced by Intel, Cyrix, AMD, IBM and Motorola.

The system memory 206 comprises a main memory 220, in the form of media such as random access memory (RAM) and read only memory (ROM), and may incorporate or be adapted to connect to secondary storage 222 in the form of long term storage mediums such as hard disks, floppy disks, tape, compact disks (CDs), flash memory, etc. and other devices that store data using electrical, magnetic, optical or other recording media. The main memory 220 may also comprise video display memory for displaying images through the output device 208, such as a display screen. The memory can comprise a variety of alternative components having a variety of storage capacities such as magnetic cassettes memory cards, video digital disks, Bernoulli cartridges, random access memories, read only memories and the like may also be used in the exemplary operating environment. Memory devices within the memory system and their associated computer readable media provide nonvolatile storage of computer readable instructions, data structures, programs and other data for the computer system.

The system bus 212 may be any of several types of bus structures such as a memory bus, a peripheral bus or a local bus using any of a variety of bus architectures.

The input and output devices are also familiar. The input device can comprise a small keyboard, a mouse, a microphone, a touch pad, a touch screen, etc. The output devices can comprise a color display, such as display 102 (FIG. 1), a printer, a speaker, a touch screen, etc. Some devices, such as a network interface or a modem can be used as input and/or output devices. The input and output devices are connected to the computer through system buses 212.

The computer system 200 further comprises an operating system and usually one or more application programs. The operating system comprises a set of programs that control the operation of the system 200, control the allocation of resources, provide a graphical user interface to the user, facilitate access to local or remote information, and may also include certain utility programs such as the email system. An application program is software that runs on top of the operating system software and uses computer resources made available through the operating system to perform application specific tasks desired by the user. In general, applications are responsible for generating displays in accordance with the present invention, but the invention may be integrated into the operating system, as part of the list view control, for example. Exemplary operating systems in which the email system may be integrated with include Microsoft Corporation's Windows CE operating system for small computer devices.

Referring back to FIG. 1, a brief discussion of a prior art display 106 (enlarged to show detail) is beneficial to the understanding of the present invention. The display 106 illustrates a typical listing of items, such as electronic documents or, in this case, email messages. The display is logically partitioned into columns 108, 110, 112, 114, 116, 118 and 120 and rows 122, 124, 126, 128, 130, 132, and 134. Additionally, the display 106 contains a conventional scroll bar 136. The first row 122 of each column provides a heading related to the name or function of the column. For instance columns 114, 116, 118 and 120 comprise information related to who sent the email message, the subject of the email message, the date the email message was received, and the size of the email message, respectively. Thus, for the email message shown in row 124 of display 106, the various properties for that message are shown horizontally across the row, indicating the message is from John Doe with a message of "Way to go!". Other columns 108, 110 and 112 may also be included to illustrate other properties associated with the items. Although described herein as designating rows for items and columns for properties, alternative displays may designate rows for properties and columns for items.

Selecting a heading for a column generally executes a sort function and sorts the items in the list by that column. Selecting the heading a second time toggles the sort algorithm between ascending order and descending order. The triangle 140, shown in FIG. 1, is displayed in the column currently used to sort the items and thus provides an indication to the user to that effect. Moreover, the triangle 140 points up or down based on whether the column has been sorted using the ascending or descending order.

If the items are sorted by a column, other than by column 118, as shown in FIG. 1, the user generally needs the "Received" column 118 to determine the relative time information related to each item. That is, the prior art display 106 provides no distinction as to when an item was received other than the explicit or literal text provided in the "Received" column 118. Moreover, column 118 consumes a relatively large portion of the display area. Indeed, due to the size of this column, information in the subject lines for at least two email messages has been truncated, as evidenced by ellipses in the subject column 116 for items displayed in rows 130 and 134. Truncating information in this manner reduces some of the information that could be displayed to the user. In essence, due to the existence of the column 118, display 106 cannot show as much information as a display generated using the present invention, such as display 300, shown in FIG. 3.

Figure 3:
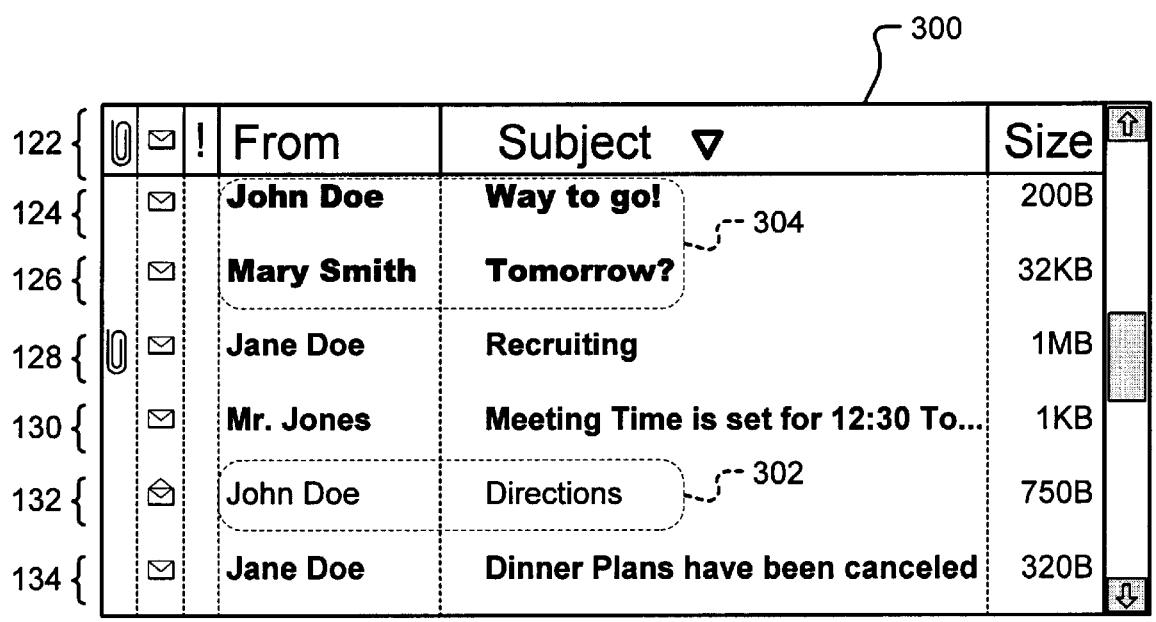
FIG. 3 is an exemplary display for an email application incorporating aspects of the present invention relating to the use of colored fonts.

Display 300 is an exemplary display generated by an embodiment of the present invention wherein the Received column 118 (FIG. 1) is not shown, yet important time information is still visually provided to the user as described in more detail below. The display 300 displays the same email messages depicted in display 106 (FIG. 1). That is the properties associated with the messages displayed in FIG. 1 are the same for the corresponding items shown in FIG. 3. Moreover, the items shown in FIG. 3 are sorted according to subject, as in FIG. 1. Thus, the primary difference between displays 106 and 300 is that the column 118 shown in 106 is not visible in 300 and variable visual indicators 302 are shown in FIG. 3 yet are not present in 106.

Time information for the items in 300 is displayed to the user through the use of variable visible indicators based on certain time characteristics. Particularly, in an embodiment of the present invention, the font for all the items is displayed in predetermined font color, where the color is representative of the relative age of the item. The various font colors are referred to as "variable" indicators since as the relative item changes over time, the color used for the item's font varies or changes to indicate the relative aging of the item. Preferably, the color varies as a gradient, so that the colors can be visually compared and contrasted by the user to provide meaningful information to the user. For instance, at least three colors or more specifically, three color hues should be chosen to display new items, older items and those items that fall between the two extremes. Many colors can be used, but too many color variations may not provide a significant benefit over smaller numbers of colors. Using font colors is a fairly straightforward process since the RGB values for the displayed text can be easily modified.

The relative age of the item is a function of when the item was received, in the case of email, or when the item was modified, in the case of other electronic documents, as compared to the current time. Each item has a time property, wherein the time property is stored in combination with other item properties such as the items name and size, among others. Comparing the age of an item to the current time provides the relative age of an item. The computer 100 incorporating the present invention has built-in clock functionality that provides the current time. In alternative embodiments, the current time can be derived from another source, such as a network server computer system. In yet another embodiment, built-in timers can be maintained to update the relative age of the items.

The variable visual indicator chosen for the fonts are a matter of design choice, as long as it provides the user with a meaningful visual indication of the information being relayed. In one embodiment, the variable visual indicator is font color, and in particular, a varying scale of one color is used for the fonts so that the user may correlate one scaled property to another, e.g., color gets darker as the item gets older. The color scale for an embodiment relates to bright red at one extreme and black at the other extreme, with at least one dark red color in between the extremes, as in a variable hue scale. This color scale corresponds to the relative age of the items in a list wherein new items are at one extreme and old items are at the other extreme. For instance, recently received items are listed using a bright red font and items that were received a relatively long time ago are listed in a black font. Additionally, items that are "middle aged," e.g., those items that fall between the characteristics of "recently received" and "old," are listed in a dark red font. Thus, the user can visually compare the font colors for various items and determine which items are more recently received without sorting the items based on time information and without the explicit text for the received column 118 shown in the prior art display 106.

Referring to FIG. 3, the color of the font 302 for the time in row 132 is the brightest, since it is the most recent. To indicate a brighter color, font 302 is shown using a thinner font. Similarly, the color of the font 304 for items in rows 124 and 126 are the darkest since they are the oldest. To indicate a darker color, font 304 is shown in a thicker font. The remaining items in the rows 128, 130, and 134 are displayed using font colors of middle shades. Determining which color to assign to an item depends on the item's relative age. Although display 300 depicts the use of colored fonts for relaying time information related to the relative age of email messages, other applications listing items having time information can use this process to display time information.

In alternative embodiments, other color schemes can be used, and more than three variations of one color can be used to indicate different degrees of relative age. Indeed, even various shades of gray can be used to indicate differences between items' comparative properties such as the differences in age. In yet other embodiments, the variable visual indicators for relative age may be font size, degree of boldness, different font types, different degrees of italic tilt, among others.

Although relative time information is provided to the user through the use of varying color or another indicator, the user may still ascertain the precise age or time information related to an item. In one embodiment, the user determines precise time information by simply opening the item. In an alternative embodiment the precise time information is determined by placing the cursor over the item for a predetermined amount of time. Placing the cursor over the item in this manner causes a pop-up indicator to display additional information to the user about the "selected" item such as time information.

Additionally, in accordance with preferred aspects, the user may still sort items based on time information. The user may select such sorting functionality from a menu, or an icon may be placed on the display, which may be selected to automatically sort the items according to the time which the items were received, or modified. Selecting the icon again toggles the sorting process between ascending and descending order.

Figure 4:
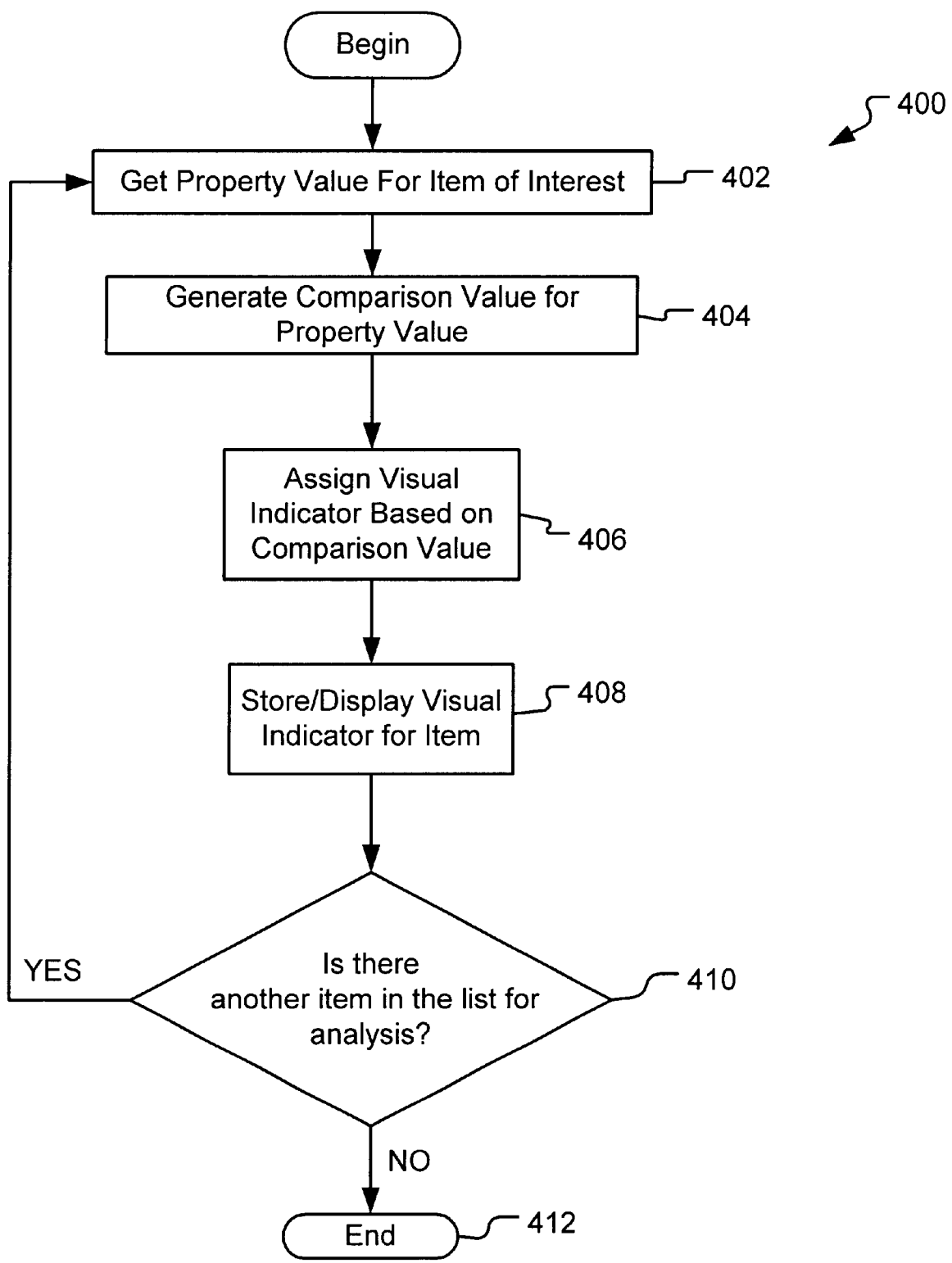
FIG. 4 is a flow diagram showing the operational characteristics of assigning a variable visual indicator to an item and displaying the item.

FIG. 4 is a flow chart of the operations in one embodiment of the present invention. The variable display operation flow 400 is executed for each item in the list of displayed items. Different methods may be employed in order to trigger display flow 400. That is, the flow may be cycled through each time the screen is updated or refreshed. Otherwise, a timer may be set to cause the flow 400 to run every couple of seconds, or every couple of minutes or once a day, etc. The frequency of the flow may impair performance and thus users may decide to reduce the frequency which the variable identifiers are updated. However, the operation flow 400 frequency should occur sufficiently often to update time information related to the various items.

Once the operation flow 400 has begun, get operation 402 gets the necessary property information related to the item currently being analyzed. If for example, flow 400 is being executed to assign font color to an item based on relative age, then get operation 402 gets the time or age property for the item. On the other hand, if the flow 400 is being executed to determine and display other information, such as size information, then get operation 402 gets the other information, e.g., size information, for the item.

Following get operation 402, generate step 404 compares the property value to another value in order to generate a comparison value. The other value is a system value that can be readily determined. For example the system value may be the current time provided by the computer system for relative age evaluations. In one embodiment, generating a comparison value at 404 requires that the process convert the property value and the system value to integers. Once converted, the property time value integer is subtracted from the current time value to provide a meaningful comparison value.

The comparison value is then used by assign operation 406 to assign a visual indicator to the item of interest. The comparison value essentially correlates to a particular visual indicator, e.g. a particular font color. Different comparison values may be stored in a look up table or the comparison value may be compared to threshold values to determine which indicator to assign to the item. In yet another embodiment, the comparison value may be used in a subsequent calculation to assign an appropriate visual indicator.

Once the item has been assigned a font color, flow proceeds to store/display operation 408. Store/display operation stores the visual indicator for the item for future reference. That is, since flow 400 is not executed every time the display is refreshed, the font color is stored and used by the display module during each refresh operation. However, if the flow 400 is executed each time the display is refreshed, then operation 408 simply displays the item in the assigned color.

Following store/display operation 408, check operation 410 tests whether more items are to be analyzed in the list. If so, then flow branches YES to operation 402 which gets the property value for the next item. Thus, flow 400 is performed for each item in the list. If check operation 410 determines that there are no more items to be analyzed according to flow 400, then the flow branches NO to end step 412 and the flow 400 is complete. The next time the display is refreshed, the newly updated visual indicators are displayed to the user.

Figure 5:
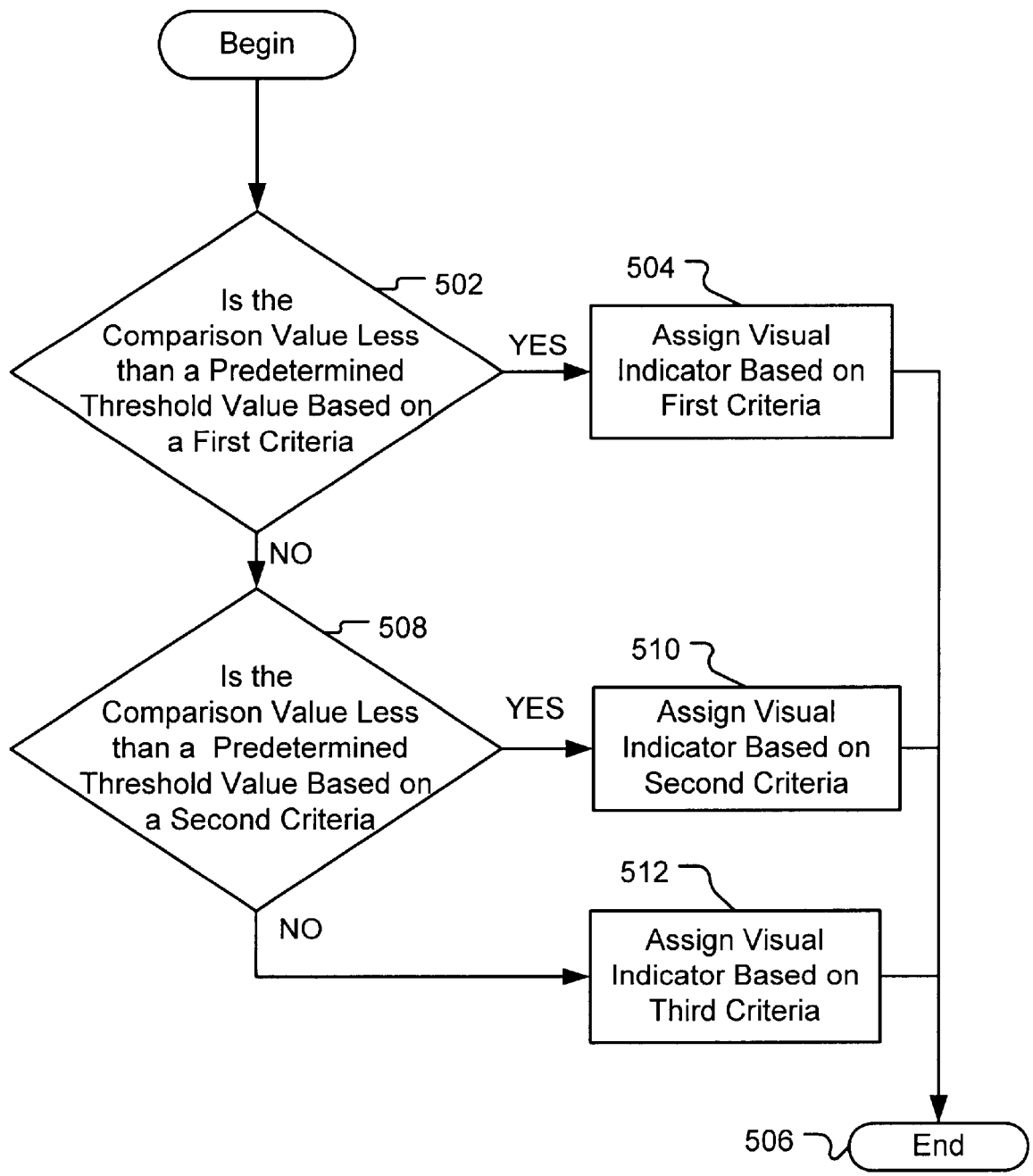
FIG. 5 is a flow diagram showing the operational characteristics of determining which variation of the variable indicator to assign to the item.

As stated above, assign operation 406 may incorporate different methods of determining which visual indicator to assign for the item. FIG. 5 illustrates one operation flow 500 that may be used in assigning the indicator. Flow 500 begins with comparison module 502, which compares the comparison value determined at operation 404 to a predetermined threshold value. The items that satisfy this condition are assigned the visual indicator representing a first category of items, e.g., recently received items, relatively small items, etc.

In essence, the predetermined threshold value is simply a value that defines the first category of items for the specified item property. As an example, for relative age determinations, the predetermined value may relate to a time value associated with recently received items. Thus, the threshold value for comparison module 502 may be set so that the category of recently received items relates only to items that have been received in the last hour, or within the last six hours or within some other predetermined time period. The category may be configured to almost any time, and the predetermined threshold value is set accordingly. Alternatively, the predetermined threshold value may be set so that the category of recently received items includes those items sent by date, as opposed to time. Thus, the predetermined threshold value may actually change as the current time value changes, or the value may simply be a day value as opposed to a time value.

If the item satisfies the first criteria, as determined at module 502, then flow branches YES to assign step 504. Assign step 504 assigns the variable indicator, e.g., the font color value to the item. In the case of font color, the assign step may simply assign an RGB value to the font for the item. For bright red colors, the RGB value may be 255, 0, 0. Of course, other colors may be assigned to represent the recently received items. Additionally, other variable indicators may be assigned to the item during assign step 504, such as font size, font type, font style, background color or hue or other visible characteristics. Once the indicator has been assigned to the item, end step 506 returns the flow to store/display operation 408 (FIG. 4) discussed above.

If comparison module 502 determines that the item does not satisfy the first criteria, then flow branches NO to comparison step 508. Comparison step 508 compares the comparison value determined at 404 to a second predetermined threshold value relating to whether the item satisfies a second criterion. This step is similar to comparison step 502 in that the same comparison value is compared to threshold value. However, step 508 uses a different threshold value that relates to a second category of items, e.g., whether the item is middle aged.

If comparison step 508 determines that the item satisfies the second criteria, and is thus of a second category of items, then flow branches YES to assign operation 510. Assign operation 510 assigns a variable indicator indicating the item satisfies the second criteria, e.g., a darker red font for middle aged items. Assign operation 510 is similar to assign step 504, discussed above but assigns indicators based on the second criteria. Once assigned, end step 506 returns flow to operation 408 (FIG. 4).

If the item does not satisfy the second criteria, e.g., is not middle aged, flow branches NO from comparison step 508 to assign step 512. Assign step 512 assigns a variable indicator indicating the item satisfies the third criteria, e.g., a black font for items that are not recently received or middle aged. Assign step 512 is similar to step 504 and operation 510, discussed above but assigns indicators based on the third criteria. Once assigned, end step 506 returns flow to operation 408 (FIG. 4).

In order to facilitate the use of more than three colors or hues, more comparison steps are added in the same manner as module 502 and step 508, and wherein each comparison operation has a corresponding assign operation such as 504 and 510.

In another, simplified embodiment that uses multiple hues to display time information, steps 402 and 404 calculate how may days old the message is and assigns this value to a variable, such as "day". The RGB value for the item becomes a calculation based on days (i.e., at operation 406). As an example, the formula could be as simple as the RGB value for an item equals (255-(days*(255 / 30)),0,0). In this case, messages older than 30 days would be drawn in black and messages received today would be drawn in red with all others falling in between. This formula could be modified to show messages in varying hues from red to black where the extremes are one day and one year. To do so, the RGB value would be sent to RGB (255- (days*(255/365),0,0) at operation 406. Operation 408 simply displays the item using the RGB value and no further calculation is generally necessary.

The above described embodiments of the invention capitalize on newer displays that incorporate color technology to provide information to the user that otherwise might not be shown, such as date and size information, by analyzing the item and modifying a visual indicator, such as the font color for the item. Specifically, the present invention analyzes the date and time of various items, such as files, email messages, and/or hyperlinks, to determine the relative "age" of the item. The item is then displayed in a colored font, where the selected color reflects the relative age of the item. As an example, email messages are displayed in different degrees of red, where bright red signifies a new email message, a darker red signifies an older email message and very dark red or black signifies the oldest email messages. Utilizing degrees or grades of a color allows the user to visualize the relative age of items in a list without necessarily showing a date/time column.

Although the invention has been described in language specific to structural features and/or methodological steps, it is to be understood that the invention defined in the appended claims is not necessarily limited to the specific features or steps described. As an example, the gradient color scheme could be applied to columns in a display that designates columns for items and rows for properties. Rather, the specific features and steps are disclosed as preferred forms of implementing the claimed invention.

What is claimed is:

1. A method of displaying property information for an item in a graphical user interface on a computer system, the method comprising;

comparing the property information to a value to generate a relative comparison value;

assigning a first visual indicator to the item related to the relative comparison value, wherein the assigned visual indicator is one of at least three possible visual indicators;

displaying the item using the assigned visual indicator;

automatically updating the relative comparison value when the value changes;

assigning a second visual indicator to the item, wherein the second visual indicator is different than the first visual indicator; and displaying the item using the second visual indicator.

2. A method as defined in claim 1 wherein the value is a current time value provided by a clock function of the computer system and the relative comparison value is the age of the item.

3. A method as defined in claim 2 wherein the visual indicator is color.

4. A method as defined in claim 3 wherein the color used for the visual indicator is one of at least three colors of the same color gradient.

5. A method as defined in claim 4 wherein the colors of the gradient comprise red, dark red and black, wherein the dark red color is darker than the red color, and the black color is darker than the dark red color.

6. A method as defined in claim 1 wherein the items are email items.

7. A method as defined in claim 1 wherein the items are tasks and the property information relates to due date times for the tasks.

8. A method as defined in claim 1 wherein the items are automatically corrected words in a word processing application, and wherein the items change color over time.

9. A method as defined in claim 1 wherein the items are traversed hyperlinks, and wherein the items darken from red to black over time and the color shows the time since this hyperlink was traversed.

10. A method as defined in claim 1 wherein the items are traversed hyperlinks, and wherein the items darken from red to black over time and the color shows the time since this hyperlink was last updated.

11. A method as defined in claim 1 wherein the step of assigning a visual indicator to the item related to the comparison value comprises the following:

comparing the comparison value to a first predetermined threshold value based on a first criteria;

if the item satisfies the first criteria, assigning the visual indicator based on the first criteria;

if the item fails to satisfy the first criteria, comparing the comparison value to a second predetermined threshold value based on a second criteria;

if the item satisfies the second criteria, assigning the visual indicator based on the second criteria; and if the item fails to satisfy the second criteria, assigning the visual indicator based on a third criteria.

12. A method as defined in claim 11 wherein the items are email messages and wherein:

the first criteria relates to recently received items and the visual indicator based on the first criteria is a bright colored font;

the third criteria relates to old items and the visual indicator based on the third criteria is a dark colored font; and the second criteria relates to items that are between recently received items and old items and the visual indicator based on the second criteria is a colored font darker than the bright colored font and lighter than the dark colored font.

13. A system for displaying variable property information comprising:

a memory unit storing an item wherein the item has property information characteristics related to time;

a processing unit comparing the property to a threshold value and assigning a variable display characteristic to the item, wherein the threshold value is associated with current time information;

a display unit displaying the item using the variable display characteristics; and an update unit updating the variable display characteristic periodically.

14. A system as defined in claim 13 wherein the threshold value changes proportionally with time.

15. A system as defined in claim 14 wherein the variable display characteristics relate to font hue.

16. A system as defined in claim 14 wherein the variable display characteristics relate to font color.

17. A system as defined in claim 13 wherein the processing unit automatically updates the variable display characteristics when the threshold value changes.

18. A system as defined in claim 17 wherein the processing unit automatically updates the threshold value and the variable display characteristics at predetermined intervals.

19. A computer program product readable by a computer and encoding instructions for executing a computer process for displaying property information for an item using variable characteristics, said process comprising:

comparing the property information to a threshold value to generate a comparison value, wherein the threshold value relates to information independent of the item;

assigning a visual indicator to the item related to the comparison value, wherein the assigned visual indicator is one of a gradient of possible visual indicators; and displaying the item using the assigned visual indicator.

20. A computer program product as defined in claim 19 wherein the process further comprises the following:

updating the threshold value at periodic intervals;

in response to the updated threshold value, comparing the property information for the item to the updated threshold value to generate a second comparison value, assigning a visual indicator to the item related to the second comparison value, wherein the visual indicator is one of the gradient of possible visual indicators; and displaying the item using the assigned visual indicator.

21. A graphical user interface for a computer system, the graphical user interface having a display module for displaying a list of items, said graphical user interface comprising:

a list view having a plurality of columns and rows, wherein one of each column or row displays at least one predetermined property type and the other of each row or column lists properties for an item;

a comparison module that compares one property type for each item to a threshold value to generate a comparison value for each item;

an assigning module that assigns a variable visual indicator to each item based on the comparison value; wherein the visual indicator is one of at least three variable indicators; and wherein the display module displays the list view in accordance with the assigned variable visual indicators.

22. A graphical user interface as defined in claim 21 further comprising:

an update module that updates the threshold value at predetermined intervals;

the comparison module comparing the property values for each item to the updated threshold value in response to the updated threshold value;

the assigning module assigning new variable visual indicators to the item in response to the new comparison value; and the display module displaying the items in response to the new variable visual indicators.

* * * * *